United States Patent [19]
Bonneaud et al.

[11] 3,820,626
[45] June 28, 1974

[54] METHOD OF AND DEVICE FOR ATTENUATING THE NOISE PRODUCED BY A JET ENGINE NOZZLE

[75] Inventors: Henri Auguste Bonneaud, Dammarie-les-Lys; Rene Gerard Hoch, La Rochette, both of France

[73] Assignee: Societe Nationale d'Etude et de Construction de Moteurs d'Aviation, Paris, France

[22] Filed: Sept. 22, 1972

[21] Appl. No.: 291,177

[30] Foreign Application Priority Data
Sept. 23, 1971  France .............................. 71.34296

[52] U.S. Cl. .......... 181/33 HC, 181/33 HD, 60/232, 239/265.13
[51] Int. Cl. ...................... B64d 33/06, F01n 1/14
[58] Field of Search ................... 181/33 HD, 33 HC

[56] References Cited
UNITED STATES PATENTS
| | | | |
|---|---|---|---|
| 2,990,029 | 6/1961 | Keen .............................. | 181/33 HD |
| 3,612,209 | 10/1971 | Vdoviak et al. ................. | 181/33 HC |
| 3,706,353 | 12/1972 | Williams et al. ............... | 181/33 HD |

*Primary Examiner*—Richard B. Wilkinson
*Assistant Examiner*—Vit W. Miska
*Attorney, Agent, or Firm*—William J. Daniel

[57] ABSTRACT

A method and device for attenuating the noise emitted by a jet engine nozzle for supersonic aircraft, the method consisting in pinching the jet issuing from the nozzle to spread the jet in a plane, and the device comprising a pair of oppositely disposed retractable panels or the like mounted within the nozzle and movable between a retracted inoperative position and an operative position in which they are effective to pinch the jet and thus spread it out in a plane so that a silencing effect is achieved in said plane.

2 Claims, 8 Drawing Figures

METHOD OF AND DEVICE FOR ATTENUATING THE NOISE PRODUCED BY A JET ENGINE NOZZLE

The acuteness of the problem posed by the noise developed as a consequence of supercritical flows, e.g. the kind encountered in the jets issuing from the ejector type nozzles of jet engines intended for supersonic transport aircraft, is well-known. Equally well-known is the fact that the commercial operation of aircraft of this kind depends among other things upon the ability to attenuate this noise, at least whilst the aircraft is manoeuvering on the airfield and during approaches to the airfield, to a sufficient degree to ensure that people living in the neighbourhood are not inconvenienced to an extent beyond that prescribed by the prevailing regulations.

The applicants, who are involved in the design and development of supersonic jet engines of this kind, have discovered that it is possible to achieve a substantial silencing effect by pinching the jet using two oppositely disposed panels or other similar and suitable means, the purpose of which is to throttle the jet and produce a certain degree of spread in it, in one plane. However it has also been observed that this silencing effect is not spatially uniform; it is very pronounced in the aforementioned plane, that is to say that of spreading of the jet, and much less pronounced in a plane at right angles thereto.

This "monoplanar" silencing effect can be exploited to reinforce the silencing effect in selected directions and thus satisfy the standards imposed for various operating conditions of aircraft. In other words, if the jet is pinched to spread it in the horizontal plane, the silencing effect which is exerted in this plane will be extremely satisfactory as long as the aircraft is on the ground, because those living nearby are in the same horizontal plane. This is not the case when the aircraft is flying over inhabited areas, in which case those living in the effected areas are located in the aircraft's vertical plane. Self-evidently, the situation would be the reverse if the jet were pinched so that it were spread and had a silencing effect, in the vertical plane.

An object of the present invention is to provide an improvement in accordance with which the jet can be spread at will either in the horizontal plane whilst the aircraft is on the ground, or in the vertical plane whilst it is in flight, by the selective operation of one or the other of two pairs of opposite panels or the like, one pair being arranged at an angle of the order of 90° to the other.

In accordance with a further feature of the present invention, applicable to the case of jet engine nozzles equipped with a "reverse thrust" system, comprising two downstream pivoting buckets, the presence of this system is exploited, during periods in which reverse thrust is not required, to effect the requisite pinching of the jet by deploying the buckets into an intermediate angular position between the inoperative position in which they are retracted and the reverse thrust position where they constitute an obstacle to the jet. In this case, in accordance with the present invention, there is added to this pair of pivoting buckets of the reverse thrust system, a pair of mutually opposite panels or the like, for pinching the jet, these being offset at an angle of the order of 90° in relation to the pair of buckets.

The panels or the like are retracted into the body of the secondary duct of the duct of the ejector type nozzle, in the inoperative position, preferably into recesses formed for the purpose in the wall of the duct through which the secondary air flows. In the operative position, in order to pinch the jet and produce the silencing effect, the panels or the like are moved so that they simultaneously move away from the wall towards the axis of the jet engine, and more translationally towards the rear of the engine.

The panels in question can be constituted by flat plates in the case of two-dimensional rectangular section nozzles, or may take the form of curved segments in the case of three-dimensional nozzles, for example ones defined by a solid of revolution. In either case, in the inoperative position they are retracted flush with the wall of the nozzle in question.

It is not essential for these panels to be solid mechanical components and, in the context of flow control techniques, it is possible to replace them by auxiliary jets or fluid curtains, performing the same function.

The invention will now be further described, by way of example, with reference to the accompanying drawings, in which.

Figures 1, 2:
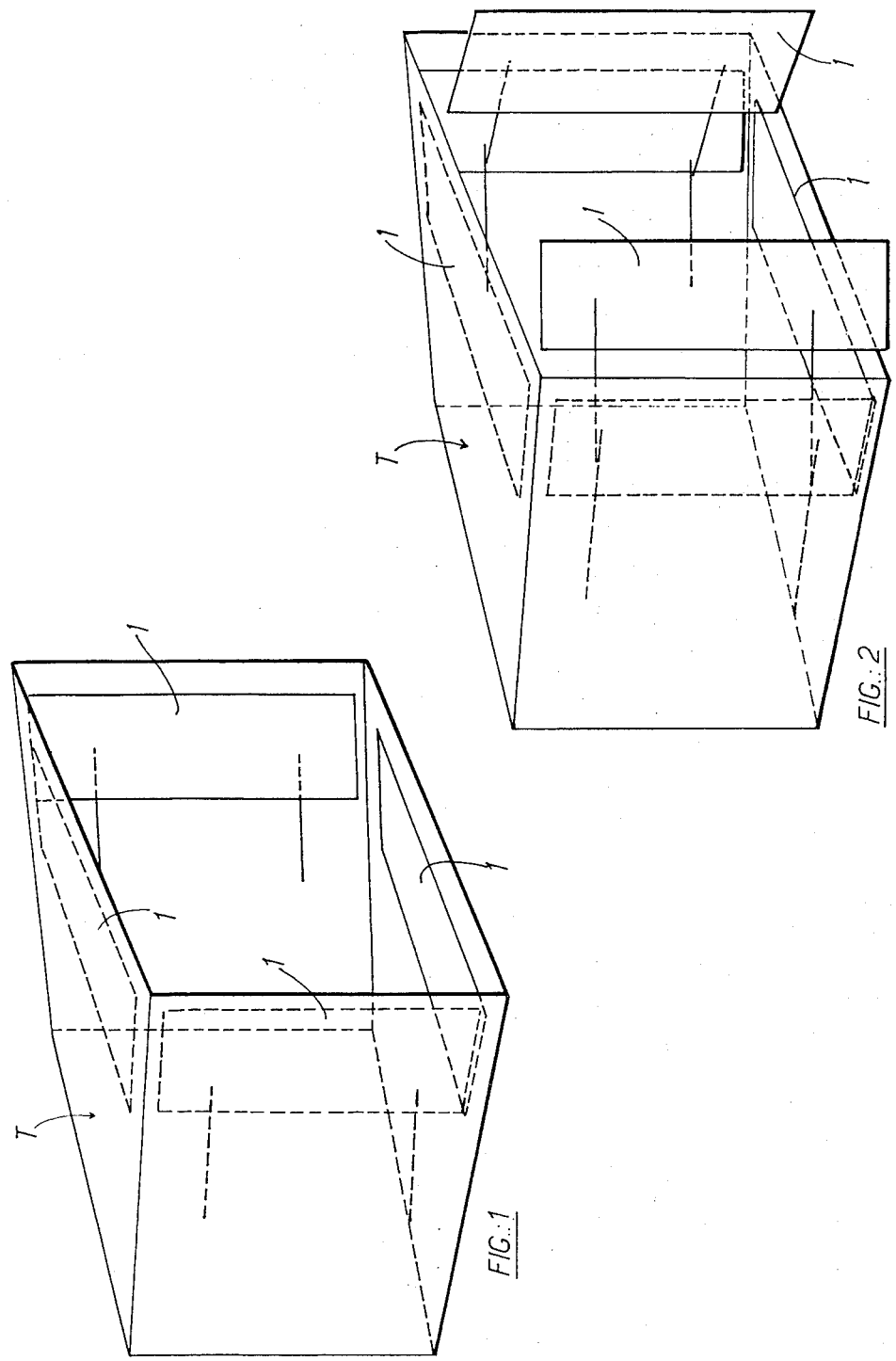
FIGS. 1 and 2 are diagrams illustrating the design and operation of the invention, these diagrams corresponding respectively to the inoperative and operative positions and relating to the case of a rectangular or two-dimensional nozzle.

In the case of the two-dimensional nozzle shown in FIGS. 1 and 2, the silencer is constituted by two pairs of opposite panels 1 which are retracted into the wall of the terminal divergent portion of the secondary duct of a nozzle T when the device is not being used, and which project into the jet in the operative position to produce the silencing effect. These panels can be made to perform a simultaneous rotational and translational movement which brings them to the desired distance from the throat of the nozzle and to the desired angle of incidence. The panels are then spaced away from the wall of the nozzle and penetrate into the jet which they pinch, causing it to break up or spread in a plane which will be vertical in the case shown in FIG. 2.

The case shown in FIG. 2 corresponds to the flyover phases of the flight. If the aircraft is on the ground, it will be the two other panels which are used.

Figure 3:
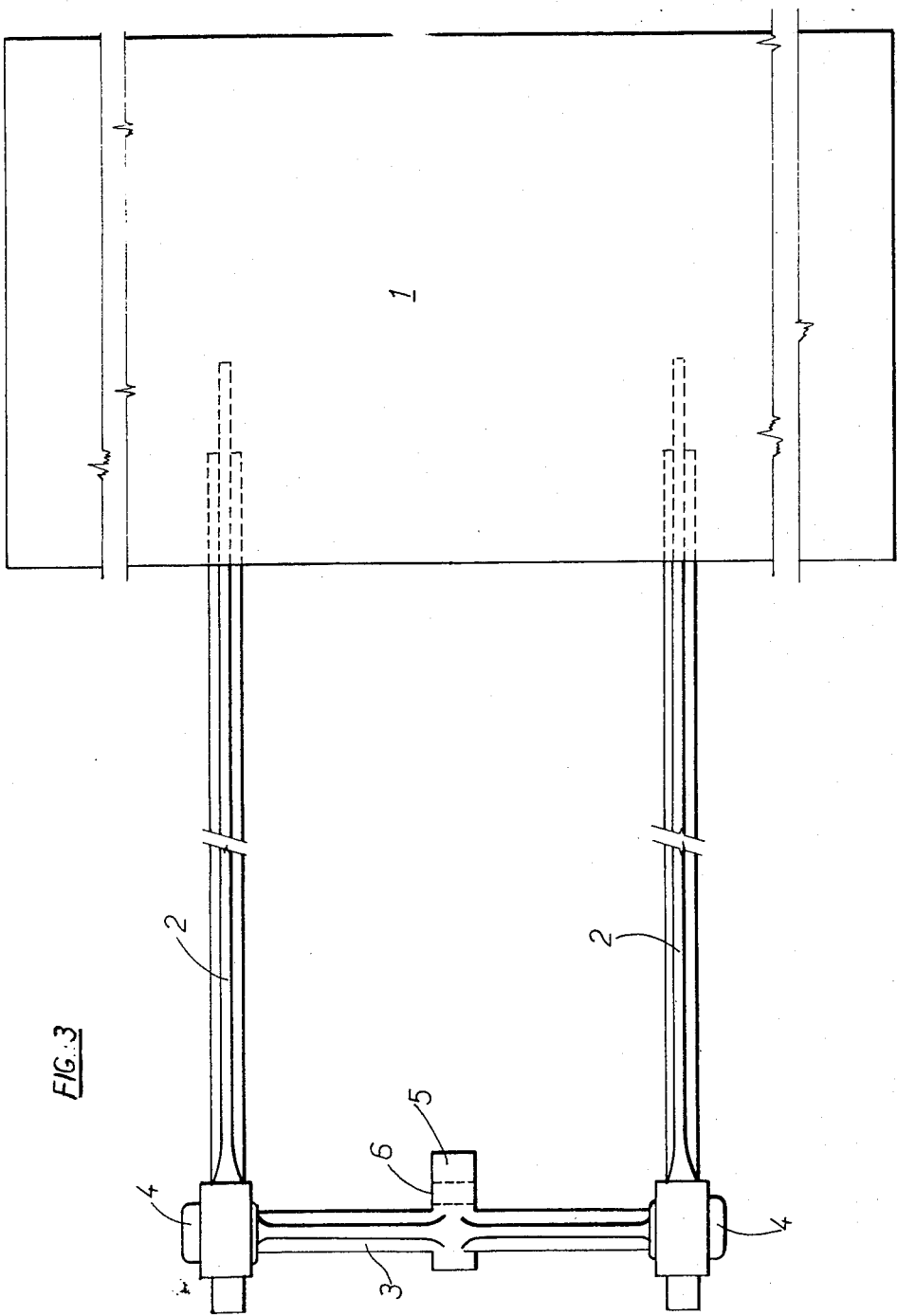
FIGS. 3 and 4 are respectively a plan view and a perspective view on a larger scale, showing the structure of an element in accordance with the present invention.
Figure 4:
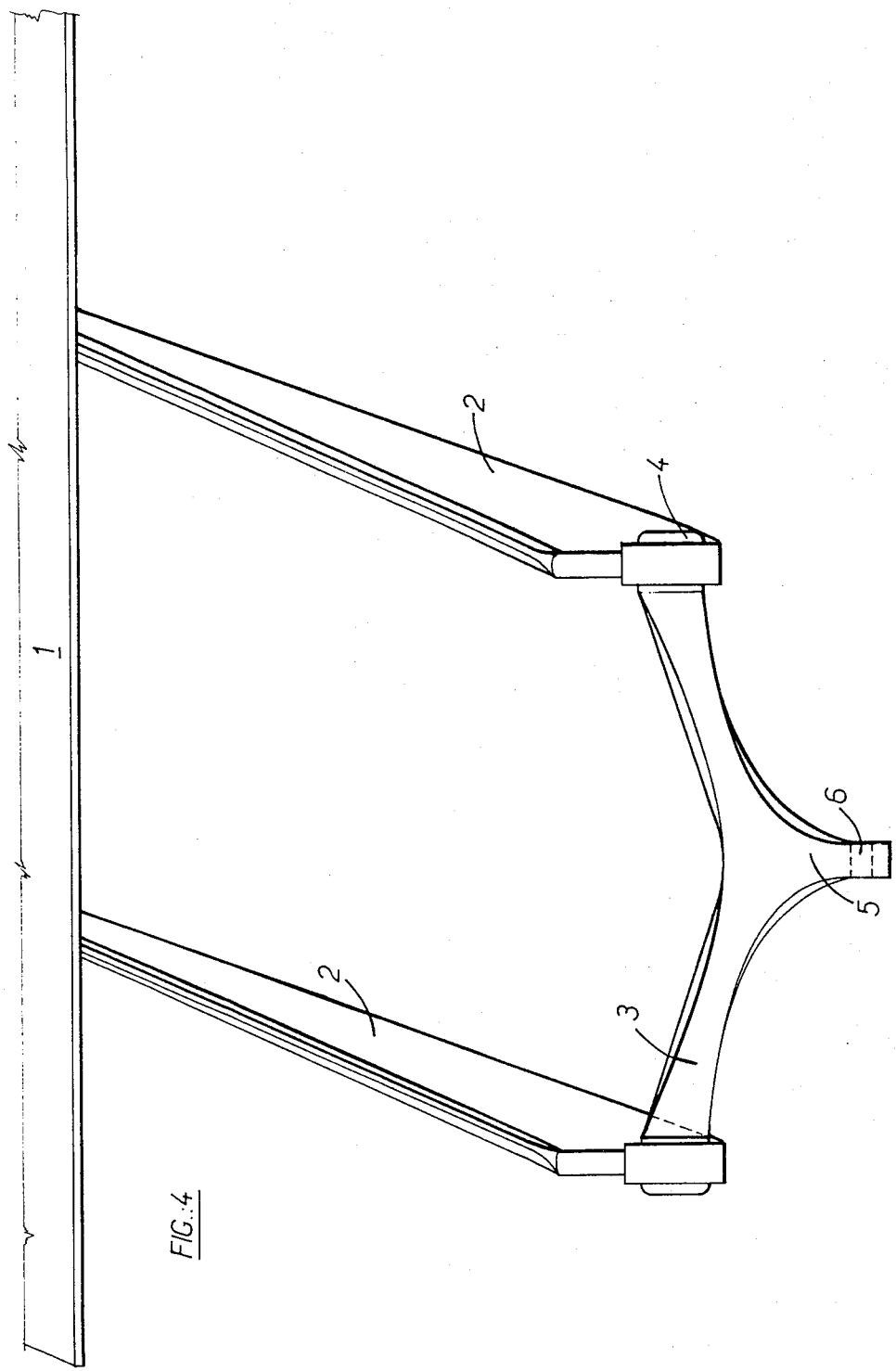
Figure 5:
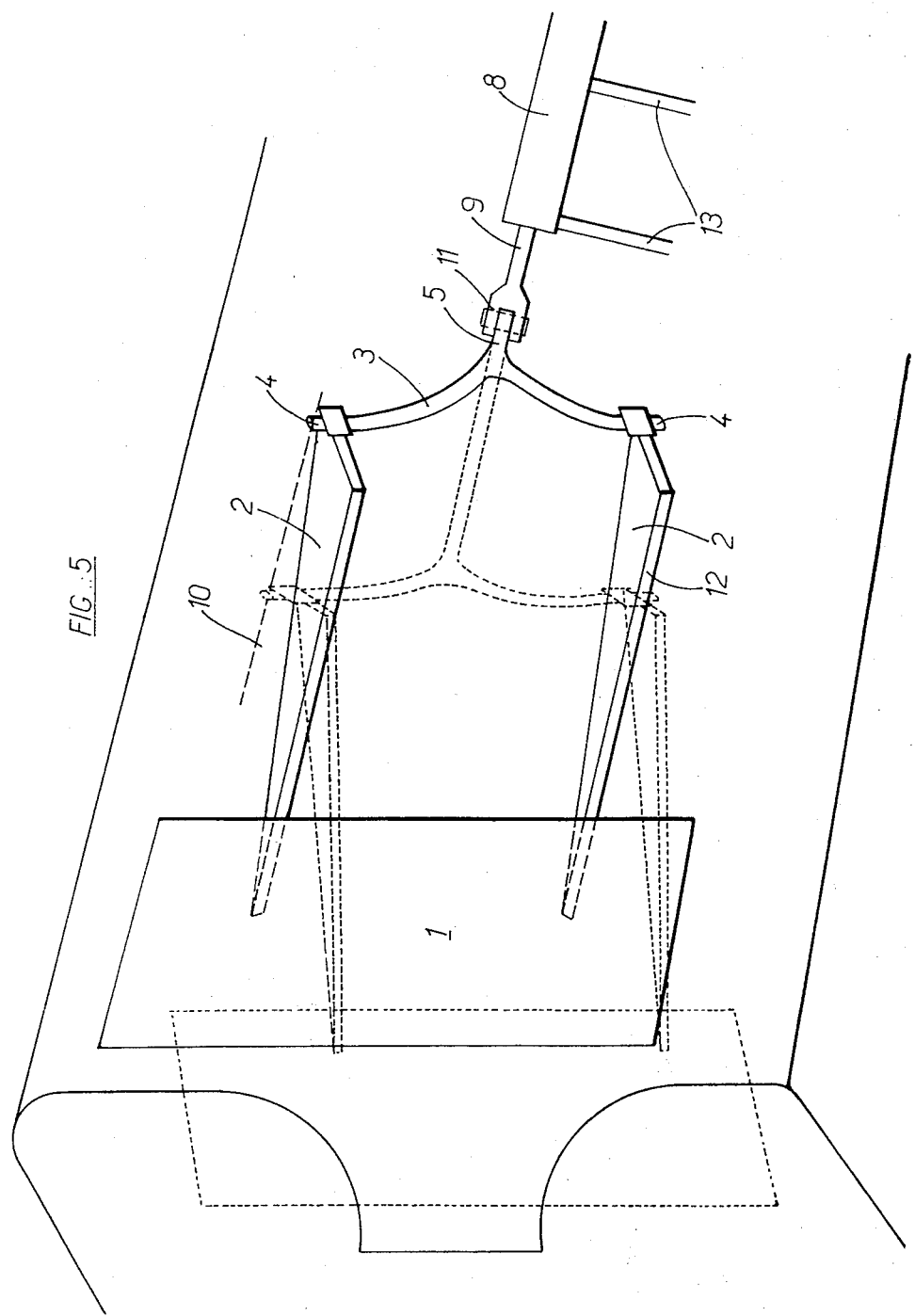
FIG. 5 is a perspective diagram illustrating the method of control of said element.

FIGS. 3, 4 and 5 illustrate one of these panels 1, carried by two arms 2—2 fixed to a ribbed fork 3 carrying at its ends two rollers 4—4 designed to slide in an internal slideway 10 in the divergent portion of the nozzle. This fork 3 is integral with a lever 5 containing a drilling 6 for connection with the fork 11 provided at the end of the piston rod 9 of a jack 8.

Under the action of the jack, the assembly comprising the panel 1, pivots about the rollers 4—4, these latter sliding downstream along the internal slideways 10. The panels 1 penetrate into the jet with their downstream edges, the arms 2—2 sliding in slots 12 formed in the wall of the divergent portion. The movements of the opposite panels are coupled and synchronised, for example by interconnectors 13 connecting the respective jacks 8, where fluid-operated jacks are concerned.

These jacks have a first part of their travel utilized to cause the panel to pivot into the fluid flow and the second part of the travel utilised for downstream translation of the whole assembly. By a reverse movement of the jets, the panel device is retracted into the wall of the divergent portion of the nozzle.

In full line, in FIG. 5, the panel 1 has been shown in its inoperative position, in which it is retracted, and in dotted line the operative position, in which it acts as a silencer. The panel 1 and the arms 2—2 are retracted in the inoperative position into correspondingly shaped recesses and restore the profile of the secondary nozzle of the nozzle. In their operative positions, the panels are detached from the wall in order not to present too great an obstacle to the secondary flow.

Figure 6:
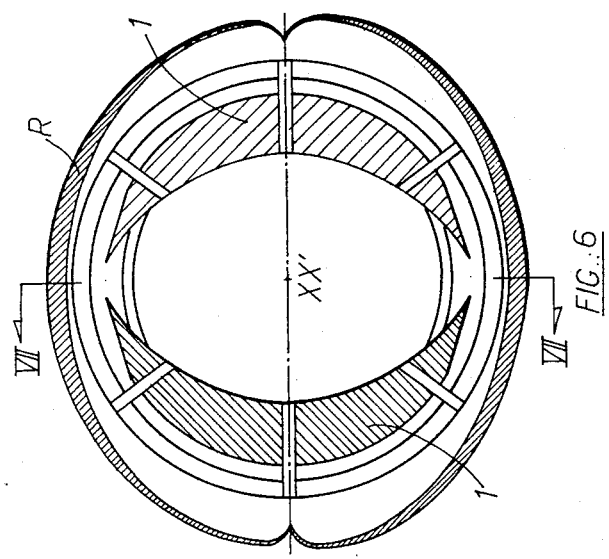
FIG. 6 is a schematic end elevation of one embodiment of a ejector type two-dimensional nozzle with a downstream reverse thrust system.
Figure 7:
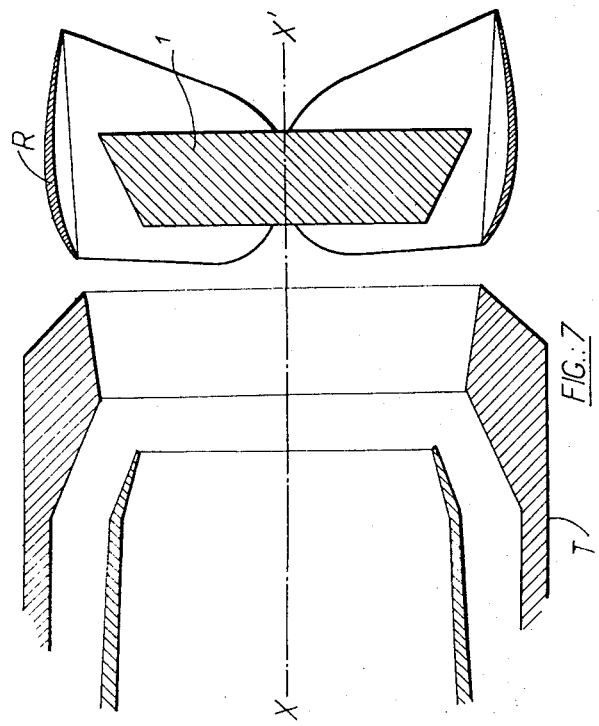
FIG. 7 is an axial section along the line VII—VII of FIG. 6.

In the case shown in FIGS. 6 and 7, where the nozzle is equipped with downstream reverse thrust system R with double buckets pivoting about a diametral axis, the system being shown in the inoperative position in which the buckets surround the jet without disturbing it, it is possible in accordance with the invention to partially deploy these buckets, outside periods of reverse thrust operation, by pivoting them to pinch the jet and spread it in the plane perpendicular to FIGS. 6 and 7 and passing through the axis X—X'. On the other hand, when it is desired to produce the silencing effect in the plane at right angles to the former, the reverse thrust buckets are left in their retracted positions and the jet will be pinched with the help of panels 1—1 located at 90° to the buckets. It is this position which has been shown in FIGS. 6 and 7, the panels 1 otherwise being inoperative and retracted into the wall of the secondary nozzle duct T, as hereinbefore described.

Figure 8:
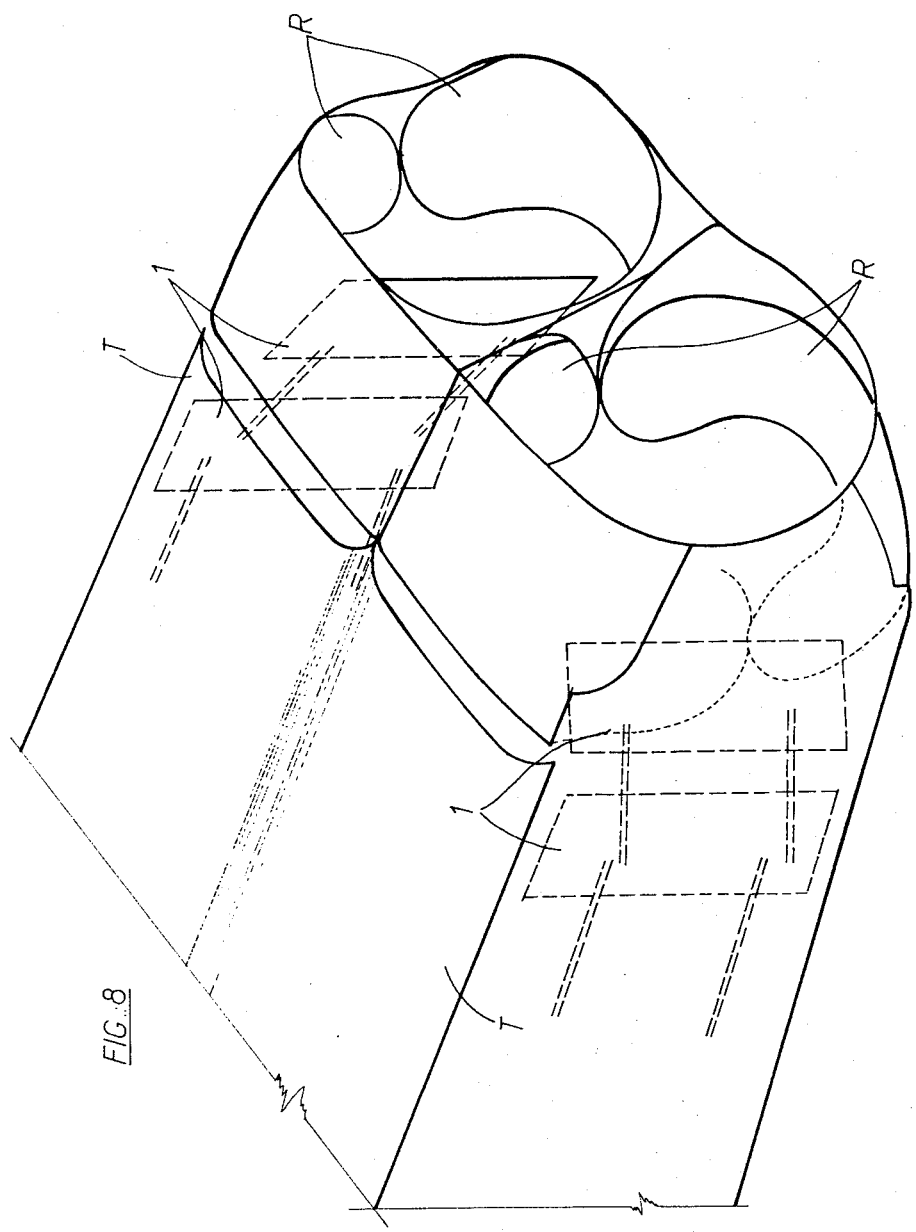
FIG. 8 illustrates the application of the invention to the case of twin nozzles.

If twin nozzles are provided, as schematically shown in FIG. 8, the desired silencing effect can be achieved by pinching the assembly of the two jets issuing from the nozzles T—T using only one pair of coupled panels, located at the opposite sides of the assembly of twin nozzles. In this fashion, a silencing effect in the vertical plane, during flyover of the aircraft can be achieved. To achieve silencing in the horizontal plane whilst the aircraft is on the ground, the reverse thrust buckets R will be used.

We claim:

1. A method of attenuating in selective radial directions the noise of a jet issuing from a jet aircraft propulsion nozzle according to whether the aircraft is proximate to the ground or in a flyover phase, comprising the steps of selectively squeezing said jet to throttlingly confine it from top and bottom to spread it out horizontally when said aircraft is proximate to the ground, and from both sides to spread it out vertically when said aircraft is in flyover phase, said jet being otherwise left unsqueezed when said aircraft is at normal altitude flight.

2. In an aircraft propelled by a jet issuing from a nozzle and operable (i) in a condition proximite to the ground, (ii) in flyover condition and (iii) at normal altitude flight condition, a controllable device for attenuating in selective radial directions the noise produced by said jet according to the condition of said aircraft, said device comprising:
a first pair of controllable means positioned adjacent the top and bottom respectively of said nozzle and actuatable in a generally vertical plane to throttlingly confine said jet from top and bottom whereby said jet spreads out in a generally horizontal plane,
a second pair of controllable means positioned orthogonally with respect to said first pair, adjacent the respective sides of said nozzle and actuatable in said generally horizontal plane to throttlingly confine said jet laterally whereby said jet spreads out in said generally vertical plane, and
means for selectively and independently actuating each of said first and second pairs of controllable means.

* * * * *